US 6,563,636 B1

(12) United States Patent
Baun et al.

(10) Patent No.: US 6,563,636 B1
(45) Date of Patent: *May 13, 2003

(54) TELESCOPE SYSTEM HAVING AN INTELLIGENT MOTOR CONTROLLER (75) Inventors: Kenneth W. Baun, Trabuco Canyon, CA (US); Brian G. Tingey, Fountain Valley, CA (US); Stanley H. Dewan, Rancho Santa Margarita, CA (US)

(73) Assignee: Meade Instruments, Corp., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/427,386

(22) Filed: Oct. 25, 1999

Related U.S. Application Data (60) Provisional application No. 60/105,660, filed on Oct. 26, 1998.

(51) Int. Cl.$^7$ ................................................ G02B 23/00
(52) U.S. Cl. .................... 359/429; 359/399; 318/266; 318/625
(58) Field of Search ................................. 359/429, 430, 359/399; 318/626, 652, 286, 466–470, 266, 625, 600, 602; 250/201, 203.1

(56) References Cited

U.S. PATENT DOCUMENTS

| | | | | |
|---|---|---|---|---|
| 4,074,128 A | * | 2/1978 | Harris et al. ............ 250/231.16 |
| 4,473,786 A | * | 9/1984 | Miyashita et al. ........... 318/602 |
| 4,541,294 A | * | 9/1985 | Byers ......................... 359/430 |
| 4,682,091 A | | 7/1987 | Krewalk et al. ............. 318/685 |
| 4,736,187 A | * | 4/1988 | Kibrick et al. .......... 250/231.18 |
| 4,764,881 A | | 8/1988 | Gagnon ....................... 364/559 |
| 4,927,252 A | | 5/1990 | Burr ............................ 350/503 |
| 5,254,919 A | * | 10/1993 | Bridges et al. ............. 318/602 |
| 5,489,142 A | | 2/1996 | Mathieu ..................... 297/327 |
| 5,537,250 A | | 7/1996 | Masunaga et al. .......... 359/430 |
| 5,600,491 A | | 2/1997 | Hull et al. .................. 359/698 |
| 5,822,116 A | | 10/1998 | Leblanc ..................... 359/430 |
| 5,912,541 A | * | 6/1999 | Bigler et al. ................ 318/600 |
| 6,304,376 B1 | * | 10/2001 | Baun et al. | |

\* cited by examiner

*Primary Examiner*—Cassandra Spyrou
*Assistant Examiner*—Lee A. Fineman (57) ABSTRACT

A telescope system has an intelligent motor controller for accurately controlling telescope position to facilitate location of celestial objects and to precisely control the speed at which the telescope moves to facilitate tracking of celestial objects. An optical encoder utilizes two photodetectors to provide enhanced servo control of the telescope positioning motors, a calibration circuit eliminates a need to test LED's during assembly of the optical encoder and a brushless mount provides electrical communication to an altitude drive motor located in a fork thereof in a manner which mitigates problems due to undesirable wrapping of an electrical cable around the mount as the mount rotates in azimuth.

26 Claims, 8 Drawing Sheets

TELESCOPE SYSTEM HAVING AN INTELLIGENT MOTOR CONTROLLER

PRIORITY CLAIM

This application takes priority from provisional patent Application Serial No. 60/105,660, filed Oct. 26, 1998 entitled "Telescope System Having An Intelligent Motor Controller", the entire contents of which are expressly incorporated herein by reference.

RELATED APPLICATIONS

This patent application is related to co-pending patent application entitled UPGRADEABLE TELESCOPE SYSTEM and to co-pending patent application entitled FULLY AUTOMATED TELESCOPE SYSTEM WITH DISTRIBUTED INTELLIGENCE, both filed on instant date herewith and commonly owned by the Assignee of this patent application, the entire contents of both of which are hereby expressly incorporated by reference.

FIELD OF THE INVENTION

The present invention relates generally to telescopes, such as those commonly used for observing/photographing celestial objects. The present invention relates more particularly to a telescope system having an intelligent motor controller for accurately controlling telescope position and for precisely controlling the speed at which the telescope moves to facilitate tracking of celestial objects therewith. The present invention further comprises an optical encoder using two photodetectors operating in quadrature to provide enhanced servo control for the telescope positioning motors, a calibration circuit for assuring reliable operation of the encoder with LED's having varying brightness characteristics and/or varying sensitivities of photodetectors and a rotatable mount which provides electrical communication to an altitude drive motor located in a fork thereof while mitigating problems due to undesirable wrapping of a power/control cable about the mount as the mount rotates.

BACKGROUND OF THE INVENTION

Telescopes for observing and/or photographing celestial objects such as planets, moons, stars, galaxies, asteroids, comets, nebulae, and the like are well known. Such telescopes range in size from small, readily portable ones to large fixed ones which are permanently located in observatories. The smaller telescopes are commonly used by students, hobbyists, and amateur astronomers. The larger telescopes are generally only used by researchers and professional astronomers.

Common types of telescopes include refractor telescopes, reflector telescopes, Schmidt-Cassegrain telescopes and Maksutov-Cassegrain telescopes. Refractor telescopes have a light collecting objective lens which focuses the collected light upon an eyepiece. The eyepiece, in cooperation with the objective lens, provides the desired magnification.

A reflector telescope utilizes a primary mirror to collect light and a secondary mirror to reflect the collected light through an opening in the telescope tube to an eyepiece. The eyepiece is mounted upon the tube, typically near the front of the tube, and is positioned orthogonal to the tube. The eyepiece cooperates with the primary mirror to provide the desired magnification.

Schmidt-Cassegrain telescopes are similar to reflector telescopes, except that the secondary mirror of a Schmidt-Cassegrain telescope reflects the collected light through an opening in the primary mirror instead of through an opening in the tube. In this manner, the eyepiece can be located directly behind the primary mirror, which is convenient for some types of viewing and photography. Additionally, light enters a Schmidt-Cassegrain telescope through a thin, two-sided aspheric lens, known as a correction plate. Further, the secondary mirror is convex, so as to increase the effective focal length of the primary mirror.

Maksutov-Cassegrain telescopes are similar to Schmidt-Cassegrain telescopes, except that in Maksutov-Cassegrain telescopes light enters the telescope through a meniscus lens and an oversized primary mirror is used to provide an unvignetted field of view.

In viewing celestial objects with any type of telescope, it is necessary to continually move the telescope, so as to maintain the telescope in desired alignment with the celestial object. This is necessary to compensate for the rotation of the earth with respect to the cosmos. Thus, such continual realignment of the telescope maintains the desired celestial object within the field of view of the telescope as the earth rotates about its axis.

Smaller, portable telescopes of the reflector, refractor, Schmidt-Cassegrain, Maksutov-Cassegrain or any other desired type are typically mounted upon a tripod to facilitate portability and use of the telescope upon uneven outdoor surfaces, such as upon the ground, upon paved surfaces, such as roads or parking lots, or upon any other desired surface.

Two different types of mount, altitude azimuth and equatorial, are commonly used to removably attach a telescope to a tripod. Altitude azimuth (alt-azimuth) mounts provide a comparatively rigid and steady mount for the telescope, but are more difficult to maintain in alignment with the desired celestial object when the telescope is being aimed manually. Altitude azimuth mounts have only two perpendicular axes of rotation, which make the altitude azimuth telescopes inherently more rigid and stable than equatorial telescopes. The altitude axis of rotation allows the telescope to pivot with respect to the mount about an horizontal axis and the azimuth axis of rotation allows the telescope to pivot about a vertical axis. In order to maintain alignment of a telescope having an altitude azimuth mount with respect to a desired celestial object, it is generally necessary to move the telescope about both the altitude and azimuth axes, since the position of celestial objects generally varies in both altitude and azimuth as the earth rotates.

Equatorial mounts facilitate easier maintenance of alignment of the telescope with a desired celestial object, since the telescope must only be moved about a single axis so as to maintain such alignment. In an equatorial mount, two orthogonal axes are configured such that one of the two axes can easily be aligned so as to be parallel to the axis of rotation of the earth. Once such alignment with the earth's axis of rotation is accomplished, then it is merely necessary to move the telescope about the other axis, so as to maintain alignment of the telescope with a desired celestial object. Thus, with an equatorial mount only a single axis of the telescope needs to be moved in order to maintain such alignment.

However, in an equatorial mount it is necessary to provide two additional orthogonal axes of alignment (similar to those of an altitude azimuth mount) in order to facilitate alignment of one axis so as to be parallel to the earth's axis of rotation. Thus, an equatorial mount actually comprises an altitude azimuth mount plus two additional axes and thus has a total of four different alignment axes. Because the equatorial mount comprises four different alignment axes, and because each axis inherently decreases the stability of the mount, it is difficult to manufacture an equatorial mount which is as stable as a comparable altitude azimuth mount (which has only two axes of alignment).

However, although such contemporary telescopes have proven generally useful for their intended purposes, they do possess deficiencies which detract from their overall effectiveness. For example, motorized telescopes frequently lack the precision required to reliably locate (under computer control) more faint celestial objects when higher magnifications are utilized. Thus, it is frequently necessary to make tedious manual adjustments in order to locate a desired celestial object and to position the desired celestial object within the center of the field of view of the telescope.

It is desirable to provide a motorized telescope system having sufficient accuracy to generally locate celestial objects of interest without requiring excessive manual adjustment of the telescope.

Further, many motorized telescopes are incapable of accurately tracking a celestial object (again, under computer control) as it moves across the sky due to the earth's rotation. While motorized telescopes frequently do provide some tracking capability, it is often not sufficiently accurate to facility celestial photography. Frequently, such tracking is accomplished by merely stepping the telescope drive motors when the position of the telescope has been determined to be substantially out of alignment with the desired celestial object. This result in jerky, sporadic movement of the telescope, which is too erratic for high quality photography.

Although the prior art has attempted to overcome this problem by utilizing telescope drive motors which run continuously during tracking, such telescope systems still tend to provide generally unsatisfactory results. The speed of such motors must frequently be varied so as to maintain desired tracking. However, such variances in the speed of the motors inherently results in alignment errors since the celestial object being tracked is moving at a constant speed. Further, even maintaining a steady speed will not facilitate celestial photography, unless the speed maintained is sufficiently close to the desired tracking speed so as to maintain the position of the celestial object being photographed within approximately the same position within the field of view. Of course, the ability to maintain the desired positioning of the celestial object being photographed within the field of view of the telescope is most important when high magnification and/or long exposure times are necessary.

It is desirable to provide a motorized telescope system in which the telescope drive motors operate at a substantially steady and accurate speed during tracking, such that a celestial object being photographed maintains a desired position within the field of view of the telescope for an extended length of time.

Further, manual adjustment of a motorized telescope may be necessary when the drive motors thereof overshoot the position of the desired celestial object during the initial location process. Unless the drive motors slow down as the position of the telescope nears alignment with the desired celestial object, inertia may cause the telescope to travel slightly past the intended alignment position. This is more likely to happen at higher magnifications. Thus, as the optical capabilities of telescopes continue to improve, the ability of motor drive systems to accurately and reliably position a telescope becomes more critical.

It is desirable to provide a telescope drive system which mitigates overshoot when moving the telescope into alignment with a desired celestial object.

Further, a problem encountered in the manufacture the optical encoders which provide position feedback for motorized telescopes involves the selection of LED's for the encoder assembly. Such LED's must have a brightness which is within a desired range in order to function properly in the encoder assembly. If the brightness of an LED is insufficient, then the pulse is generated by the encoder will have insufficient width such that when the pulses from two photodetectors should overlap, they will not overlap and when the brightness of the LED is excessive, the pulses will have too great of a width, such that the pulses from two photodetectors will overlap when they should not overlap. Thus, incorrect brightness of an LED will inhibit proper quadrature operation of an encoder assembly.

It is desirable that the photodetector provide an output having a substantially square waveform, i.e., wherein the corners of the pulses are not appreciably rounded and the slopes of the raising and falling edges of the pulses are generally vertical. This is necessary so as to allow the output of the photodetector to be provided directly to a microcontroller. If the waveform of the pulse is substantially degraded, i.e., has substantially rounded edges and/or excessively sloped rising and falling edges, then the output of the photodetector must be conditioned, so as to provide a signal which is suitable for input to a microcontroller. Typically, the microcontroller will be used to count the pulses input thereto within a given length of time, so as to determine the rate at which the pulses are being generated. Pulses which are not sufficiently well defined will not be counted, and a false determination of the position and/or speed of the telescope drive motor will result. Such a false determination of the position and/or speed of the motor will adversely affect the ability of the drive motor system to position the telescope accurately.

When the output of an LED is too weak, then the output pulse of a photodetector formed therefrom will tend to be rounded. The peak amplitude of the pulse may not be reached until some time after the encoder has gated the light to the photodetector. This will cause the pulse to be too narrow and possible have reduced amplitude. The rising edge of the pulse will be poorly defined and the pulse will possibly be unrecognizable by the microcontroller.

When the output of an LED is too strong, then the output pulse will tend to be too broad and may even begin to overlap adjacent pulses, making them indistinguishable from one another, particularly at higher motor speeds. This occurs because light from the LED is reflected by surrounding structures and begins to reach the photodetector before the encoder is aligned so as to gate the light through and continues to reach the photodetector even after the encoder has ceased to gate the light through. In this instance, the microcontroller will not recognized individual pulses and will again provide an inaccurate count.

In an attempt to mitigate this problem, contemporary practice requires that LED's be tested prior to assembly into an encoder assembly, such that only those LED's having a brightness within the desired range are utilized. However, such testing is a time consuming and expensive process.

Further, photodetector sensitivities can vary substantially. Indeed, matched LED/photodetector pairs are commonly sold so as to account for variations and brightness of the LED, as well as variations and sensitivity of the photodetector.

It is desirable to provide for the use of LED's having a broad range of intensities and for photodetectors having a broad range of sensitivities in encoder assemblies, without adversely affecting the accuracy or reliability of the encoder assembly.

A problem occasionally encountered in the use of motorized telescopes is the undesirable twisting or winding of control and/or power cables around the telescope as the telescope moves in azimuth, as when a celestial object is being tracked for observation or photography for an extended period of time. The altitude motor of a motorized telescope is mounted upon a rotating portion of the telescope mount, typically the fork. Thus, as the telescope rotates in azimuth, the electrical cable which provides electrical power and/or control signals to the altitude motor tends to wrap around the mount.

If the electrical cables become wrapped tightly around the mount, they may cause damage, The cables and/or their connectors may be broken as the mount continues to move and pull the electrical cables even tighter. Such wrapping of the electrical cables may even topple the telescope as they are pulled tight. Toppling of the telescope is very likely to result in substantial and costly damage thereto. It is even possible that the telescope or nearby people may be hurt.

In an attempt to mitigate the problems associated with such wrapping of the electrical cables around the mount, slip rings have been used to transfer power and/or control signals from the stationary portion of the telescope mount to the rotating portion thereof. However, such slip rings are prone to problems caused by wear and contamination. Both wear and contamination result in poor electrical contact of the slip rings, making them difficult to maintain and unreliable.

It is desirable to provide a mechanism for mitigating the problems associated with electrical cables wrapping around the mount of a telescope as the telescope rotates in azimuth.

SUMMARY OF THE INVENTION

The present invention addresses and alleviates the above mention deficiencies associated with the prior art. More particularly, the present invention comprises a telescope system of the type commonly used to observe/photograph celestial objects. Although the present invention is discussed herein as being used for observing/photographing celestial objects, those skilled in the art will appreciate that such telescopes are also commonly used to observe/photograph terrestrial objects. For example, telescopes are frequently used in nature photography to facilitate photography at a distance, so that wild animals are not disturbed. Thus, discussion herein of celestial observation/photography is by way of example only and not by way of limitation.

More particularly, the present invention comprises a telescope system comprising a telescope, a tripod supporting the telescope, a mount attaching the telescope to the tripod so as to facilitate rotation of the telescope about two generally orthogonal axes, and at least one controller/motor drive assembly for effecting desired rotation of the telescope about at least one of the two generally orthogonal axes. Preferably, the present invention comprises two controller/motor drive assemblies, wherein one of the two controller/motor drive assemblies effects desired rotation about each one of the two generally orthogonal axes.

Each controller/motor drive assembly comprises an electric motor coupled to move the telescope about one of the two generally orthogonal axes, a control circuit coupled to drive the motor, and an encoder coupled to provide feedback from the motor to the control circuit to facilitate enhanced position control of the telescope. The control circuit is configured to cooperate with the encoder to cause the motor to position the telescope as desired.

The motor preferably comprises a DC motor. As those skilled in the art will appreciate, DC motors are inexpensive and the speed and direction of DC motors can be controlled simply by varying the voltage and/or pulse width (as in pulse width modulation control) applied thereto.

The control circuit preferably comprises a microcontroller, preferably a PIC 16C54 or similar microcontroller. Those skilled in the art will appreciate that a general purpose microprocessor may alternatively be utilized. Further, dedicated circuitry, preferably very large scale integrated (VLSI) circuitry, may be utilized.

The encoder preferably comprises an optical encoder of the type having a spoked or toothed wheel which alternately blocks and transmits light. Alternatively, various other types of encoders, e.g., magnetic, electric, etc., may similarly be utilized.

According to the preferred embodiment of the present invention, the encoder wheel is attached directly to the motor shaft. However, as those skilled in the art will appreciate, the encoder wheel may alternatively be located elsewhere along a gear train which communicates rotary motion from the motor to the telescope. However, it will be appreciated that resolution is enhanced by positioning the encoder proximate the motor, which rotates faster than other portions of the gear train.

According to the preferred embodiment of the present invention, an LED directs light toward the encoder wheel and two photodetector receive light from the encoder so as to facilitate operation of the encoder in quadrature, as discussed in detail below.

The control circuit is preferably configured to control a speed at which the telescope moves, so as to facilitate accurate tracking of a celestial object being view/photographed. Further, the control circuit is preferably configured to reduce the speed at which the motor is moving the telescope as the telescope nears a desired position thereof, so as to mitigate overshoot of the telescope.

Optionally, the control circuit is configured to receive a signal representative of an angle by which the telescope is to be moved and is configured to cause the telescope to move by that angle. Optionally, the control circuit is further configured to store a present position of the telescope, receive a desired new position of the telescope, calculate a difference between the present position of the telescope and the desired new position of the telescope, and cause the telescope to move by approximately the calculated difference.

According to the preferred embodiment of the present invention, a plurality of sensors, preferably two photodetectors, receive light from the light source, e.g., LED, after the light passes through the encoder wheel. The encoder wheel alternately permits light to travel from the light source to the light sensors and prevents light from traveling from the light source to the light sensors. Since movement of the encoder wheel is proportional to the speed of the motor, the output of the light sensors is representative of the speed of the motor. The light sensors are coupled to provide a signal to the control circuit which is representative of the speed of the electric motor to facilitate servo control of the electric motor.

The two light sensors are preferably configured to operate in quadrature, so as to provide enhanced resolution of the rotational position of the encoder wheel. The two light sensors are positioned apart from one another approximately the distance of one half of a radially extending tooth or sprocket of the encoder wheel, such that they are capable of sensing an intermediate position of the encoder wheel which cannot be sensed when only one light sensor is utilized.

More particularly, the use of two light sensors configured to operate in quadrature facilitates the sensing of the following four positions of the encoder wheel: both sensors blocked, the first sensor not blocked and the second sensor blocked, the first sensor blocked and the second sensor not blocked, and both sensors not blocked. Since the use of only a single light sensor facilitates the sensing of only two positions of the encoder wheel, i.e., blocked and not blocked, quadrature operation doubles the resolution of the encoder wheel, thus providing enhanced position control of the telescope. More importantly, the use of quadrature facilitates determination of the direction of rotation of the motor.

According to the preferred embodiment of the present invention, a calibration circuit is coupled to the control circuit and to the light source, to set a brightness of the light source to a desired level. The light sensor(s) are coupled to provide a signal to the control circuit which is representative of a brightness of the light source and the control circuit is configured to determine a brightness of the light source from the signal. The control circuit is configured to vary the brightness of the light source, so as to maintain the brightness of the light source within a desired range.

Varying the brightness of the light source to maintain the brightness within a desired range allows construction of an encoder assembly comprising untested LED's and photodetectors. Thus, the brightness of the LED's and the sensitivity of the photodetectors does not have to be verified prior to construction of the encoder assembly. Eliminating the need for such testing or pre-selection of the LED's and photodetectors substantially reduces the cost of manufacturing the encoder assembly.

Further, the ability to vary the brightness of the LED's mitigates problems due to variations in brightness throughout the life of the LED, due to aging and/or soiling thereof. As those skilled in the art will appreciate, LED's tend to vary in brightness during the life thereof. Also, contamination or soiling of the LED may cause its brightness to diminish substantially, thus requiring undesirable and time consuming maintenance of the encoder assembly.

The calibration circuit preferably comprises a plurality of resistors which are configured to be selectively placed into series with the LED, so as to limit current through the LED in a manner which provides the desired brightness thereof. The control circuit senses the brightness of the LED and selects the resistor(s) necessary to provide the desired brightness. Preferably, the resistors are switchable so as to be placed in parallel with one another and in series with the LED.

According to the preferred embodiment of the present invention, a motorized mount attaches the telescope to the tripod and facilitates positioning of the telescope as desired. The motorized mount comprises a base fixedly attached to a tripod. A fork is pivotally attached to the base via a fork pivot to facilitate movement of the telescope in azimuth. The telescope is pivotally attached to the fork to facilitate movement of the telescope in altitude. An azimuth motor is attached to the base and coupled to rotate the fork. An altitude motor is attached to the fork and coupled to rotate the telescope. An electrical cable extends from the base to the altitude motor, preferably through the fork, for providing electrical communication to the altitude motor, preferably from either a controller/motor interface or from a hand-held motor control.

In order to mitigate problems associated with the electrical cable wrapping around the mount and/or the tripod, stops are provided to limit rotation of the telescope about the azimuth axis. More particularly, a base stop is formed upon the base, a fork stop is formed upon the fork, and an intermediate stop is configured to rotate independently with respect to the base and the fork. The fork stop abuts the intermediate stop and the intermediate stop abuts the base stop when the fork is rotated less than two revolutions with respect to the base. Limiting rotation of the fork to less than two revolutions with respect to the base limits wrapping of the cable around the fork pivot, the mount, and/or the tripod.

The fork stop preferably comprises a post formed upon the fork and extending downwardly therefrom. Similarly, the base stop preferably comprises a post formed to the base and extending upwardly therefrom. The fork stop and the base stop are configured such that the do not interfere with one another as the fork rotates relative to the base.

Preferably, the intermediated stop is configured to rotate about the fork pivot. The intermediate stop is preferably defined by a lever which extends from the fork pivot and is rotatably attached thereto.

Thus, the present invention comprises a telescope system having an intelligent motor controller for accurately controlling telescope position and for precisely controlling the speed at which the telescope moves to facilitate tracking of celestial objects therewith. The present invention further comprises an optical encoder using two LED's to provide enhanced servo control the telescope positioning motors thereof, a calibration circuit for assuring reliable operation of the encoder with LED's having varying brightness characteristic and a brushless mount for providing electrical communication to an altitude drive motor located in a fork thereof.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the construction and functions of the invention, as well as the sequence of steps for operating the invention in connection with the illustrated embodiment. It is to be understood, however, that the same or equivalent functions may be accomplished by different embodiments that are also intended to be encompassed within the spirit and scope of the invention.

The telescope system having an intelligent motor controller of the present invention is illustrated in FIGS. 1 through 12, which depict a presently preferred embodiment thereof.

Figure 1:
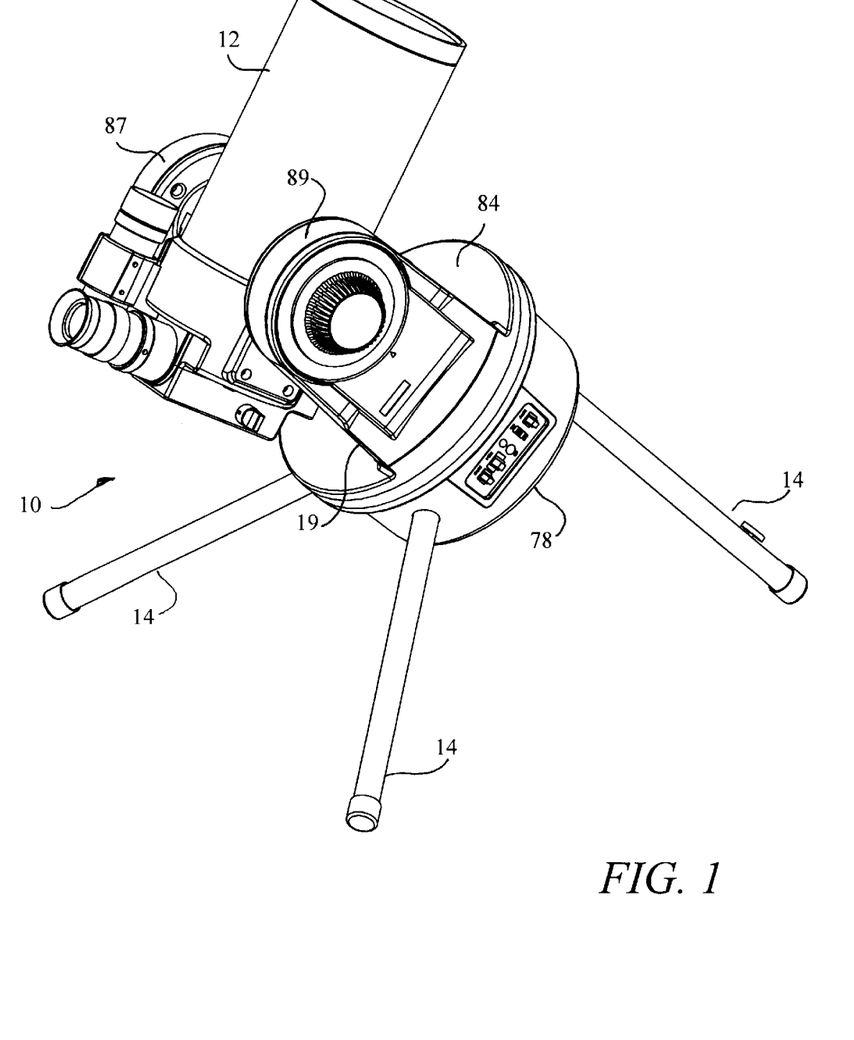
FIG. 1 is a perspective view of a telescope system, wherein a telescope is supported by a tripod.

Referring now to FIG. 1, the telescope system 10 of the present invention comprises a telescope 12 supported by a tripod 14 and attached to a mount defined by a base 78, base plate 84, and arms 87 and 89. Arms 87 and 89 are fixedly attached to the base plate 84 and extend therefrom. Base plate 84, and arms 87 and 89 define a fork 19 which is rotatably attached to the base 78. The base 78 and fork 19 facilitate rotation of the telescope 12 about two orthogonal axis, i.e., an altitude axis defined by a first pivot which allows the telescope 12 to rotate with respect to the fork 19 and an azimuth axis defined by a second pivot which allows the fork 19 to rotate with respect to the base 78.

Preferably, the present invention is configured such that the tripod can be removed and the telescope can be set upon a flat surface such as a table top such that it is supported by the mount. When the telescope is used upon a flat and level surface, then the vertical axis of the mount defines an azimuth axis and the horizontal axis of the mount defines an altitude axis.

It will be appreciated that the terms "altitude" and "azimuth" are defined broadly herein, since the legs of the tripod 14 can be adjusted to orient these axes such that they do not actually effect movement strictly in either altitude or azimuth. Indeed, it is possible to adjust the legs of the tripod such that the mount functions like an equatorial mount. However, as used herein, those terms are not inconsistent with the definitions typically given to them by those skilled in the art and are clearly consistent with the structural features of the invention. Moreover, when the legs of the tripod 14 are removed so that the base 16 is level, then the terms "altitude" and "azimuth" assume their more common definition.

Figure 2:
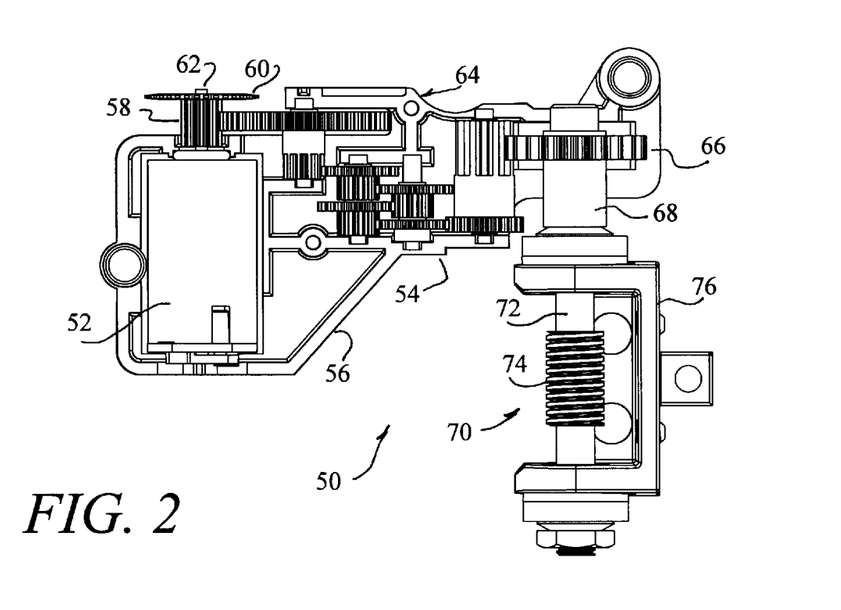
FIG. 2 is a plan view of the azimuth motor/reduction gear/worm gear assembly of the telescope of FIG. 1.

Referring now to FIG. 2, an azimuth motor/reduction gear/worm gear assembly 50 for the telescope of FIG. 1 is shown. Motor 52 preferably runs at approximately 0 to approximately 15,000 RPM to provide sufficient torque for rotating the telescope 12 about the azimuth axis. Motor 52 preferably comprises a DC motor, whose speed is varied by merely varying the voltage and/or pulse width of a series of pulses applied thereto. Reduction gear assembly 54 reduces the speed of rotation and increases the torque by providing a gear ratio of approximately 205.3 to 1. The motor 52 and the reduction gear assembly 54 are mounted to platform 56. The motor 52 is preferably mounted to the platform 56 via shock/vibration isolation mounts to mitigate the transmission of undesirable vibration from the motor 52 to the telescope 12, where such vibration causes undesirable movement of the field of view of the telescope 12. The platform 56 is similarly shock/vibration isolated, as described in detail below.

Primary gear 58 is attached to the shaft 60 of motor 52. An encoder wheel 62 is also attached to the shaft 62 of motor 52, and is preferably formed to primary gear 58. Primary gear 58 drives intermediate gears 64 and intermediate gears 64 drive output gear 66 to provide the desired gear ratio. Output gear 66 has output coupling 68 formed thereto for facilitating attachment thereof to worm gear assembly 70. Preferably, a shaft 72 of worm gear assembly 70 is received within and engages output coupler 68, such that rotary motion of output gear 66 is transmitted to the shaft 72. The shaft 72 of the worm gear assembly 70, upon which worm 74 is formed, is shock/vibration isolated from the worm mount 76, as described in detail below.

Figure 3:
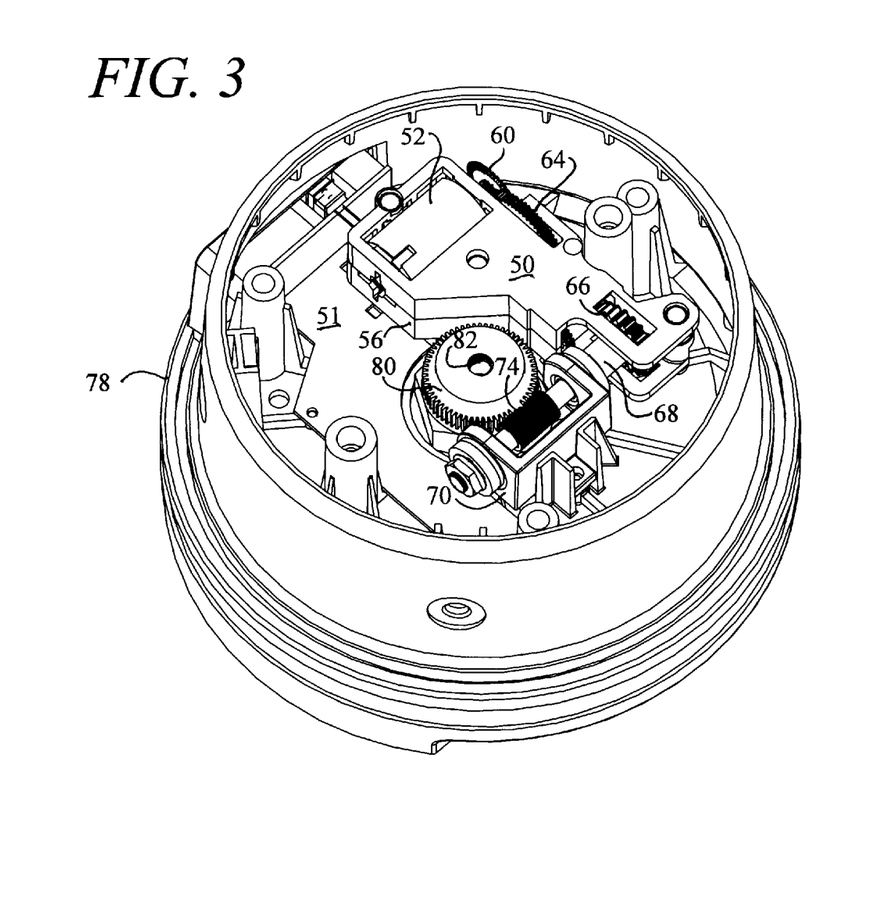
FIG. 3 is a perspective view of the base of the motorized mount of FIG. 1, with the base turned upside down to show the azimuth motor/reduction gear/worm gear assembly and the motor controller printed circuit board thereof.

Referring now to FIG. 3, the azimuth motor/reduction gear/worm gear assembly 50 is attached to telescope mount base 78, preferable via threaded fasteners such as bolts or screws. The platform 56 of the motor/reduction gear/worm gear assembly 50 is attached to the base 78 via shock/vibration isolators such as rubber o-rings or the like which are preferably position around the threaded fasteners which attach the platform 56 to the base in a manner similar to that shown in FIG. 5 for attaching platform 114 to arm 87. The base 78 is fixedly attached to the tripod head. The base 78 shown in FIG. 3 is upside down, so as to clearly show the motor/reduction gear assembly/worm gear assembly 50 located therein. The worm 74 drives worm gear 80 which is attached via a clutch to azimuth pivot shaft 82. The worm 74 to worm gear 80 connection preferably provides a gear ratio of approximately 60 to 1. The shaft 82 is rotatably attached to base 78 and is fixedly attached to rotating base plate 84 (FIG. 4), to which the telescope mount fork is attached so as to facilitate rotation of the telescope 12 in azimuth. A motor control circuit is formed upon printed circuit board 51, as discussed below.

Figure 4:
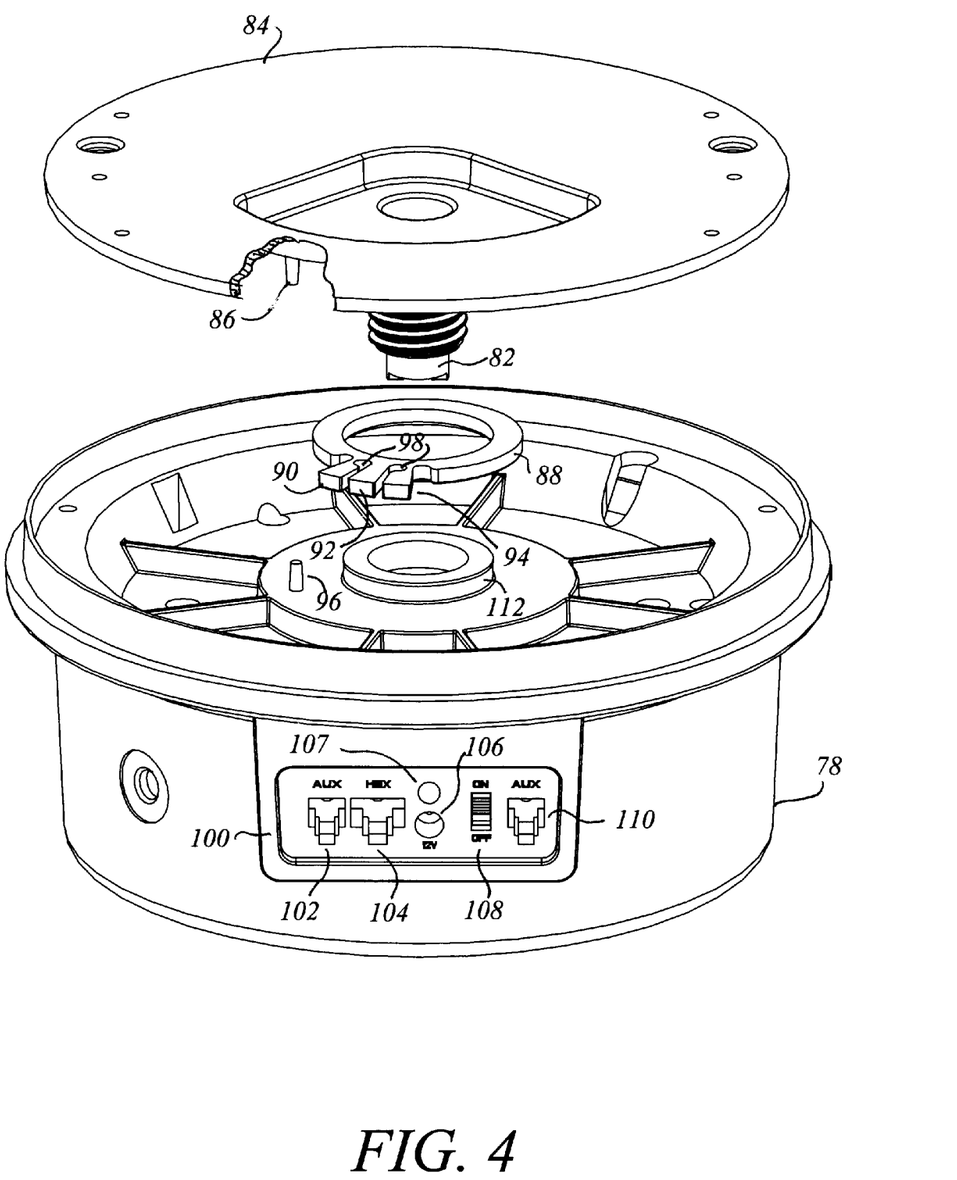
FIG. 4 is a perspective view of the base of the motorized mount of FIG. 1, showing the bottom of the fork assembly (base plate), base stop, fork stop and intermediate stop.

Referring now to FIG. 4, the base 78 of FIG. 3 is shown right side up (inverted with respect to FIG. 3). The rotating base plate 84, upon which the fork 19 and telescope 12 are mounted, is attached to the base 78 via azimuth pivot shaft 82 in a manner which limit rotation of the rotating base plate 84 to less than two revolutions with respect to the base 78. This likewise limits rotation of the telescope 12 to less than two revolutions with respect to the tripod 14. Such rotation limitation mitigates undesirable wrapping of an electrical cable (not shown) which supplies power and/or control signals to the altitude drive motor 85 (FIG. 5), which is located within one arm 87 of the fork to which the telescope 12 is pivotally attached. The electrical cable may either be located within the base 78 (in which case the electrical cable passes through an aperture in the rotating base plate 84 to pass from the base 78 to the arm 87), or may be located outside of the base 78. If the cable is located within the base 78, then the cable tends to wrap around the azimuth pivot shaft 82 as the base plate 84 rotates. If the cable is located outside of the base 78, fork or tripod then the cable tends to wrap around the base 78 as the base plate 84 rotates. In either instance, such wrapping is undesirable, as discussed above.

More particularly, the base plate 84 comprises a stop, preferable defined by downwardly extending post 86 and the base 78 likewise comprises a stop, preferably defined by upwardly extending post 96. The downwardly extending post 86 and the upwardly extending post 96 are configured such that they do not interfere with one another as the base plate 84 rotates with respect to the base 78.

An intermediate stop 88 is configured to rotate, preferably about azimuth pivot shaft 82. The intermediate stop 88 is configured such that when the base plate 84 rotates less than two times with respect to the base 78, then the downwardly extending post 86 abuts the intermediate stop 88 and the intermediate stop 88 abuts the upwardly extending stop 96, so as to halt further rotation of the base plate 84 with respect to the base 78 in a manner which mitigates undesirable wrapping of the electrical cable.

According to the preferred embodiment of the present invention, the intermediate stop 88 is defined by a ring which encircles and rotates about the azimuth pivot axis 82. The intermediate stop 88 is preferably pivotally attached to boss 112 formed upon base 78. The intermediate stop 88 preferably comprises first 90, second 92 and third 94 protrusions. The first protrusion 90 contacts the upwardly extending post 96 of the base 78 when the base plate 84 is rotated clockwise and the first protrusion 90 contacts the downwardly extending post 86 of the base plate 84 when the base plate 84 is rotated counter-clockwise. In a like fashion, the third protrusion 94 contacts the downwardly extending protrusion 86 when the base plate 84 is rotated clockwise and the third protrusion 94 contacts the upwardly extending post 96 when the base plate 84 is rotated counter-clockwise.

Preferably, the first 90 and third 94 protrusions are sufficiently flexible as to bend slightly when the downwardly extending post 86 abuts the intermediate stop 88 and the intermediate stop 88 abuts the upwardly extending post 96, so as to cushion the resulting cessation of rotation of the base plate 84. The second protrusion of the intermediate stop 88 limits such bending of the first 90 and second 94 protrusions. Cutout 98 formed at the bases of the first 90 and third 94 protrusions enhance the flexibility thereof, so as to facilitate such bending.

A controller/motor interface 100 facilitates electrical interconnection of a hand held motor controller to the azimuth 52 and altitude 85 motors via jack 104. Auxiliary jacks 102 and 110 facilitates the electrical interconnection of additional devices, such as a data logger, personal computer, global positioning system (GPS), electronic leveler, CCD camera, RS-232 port, Internet connection, etc. Power jack 106 facilitates the connection of a power source for the azimuth 52 and altitude 85 drive motors. Power indicator light 107 illuminates when power is provided via power jack 106, and when switched on.

Figure 5:
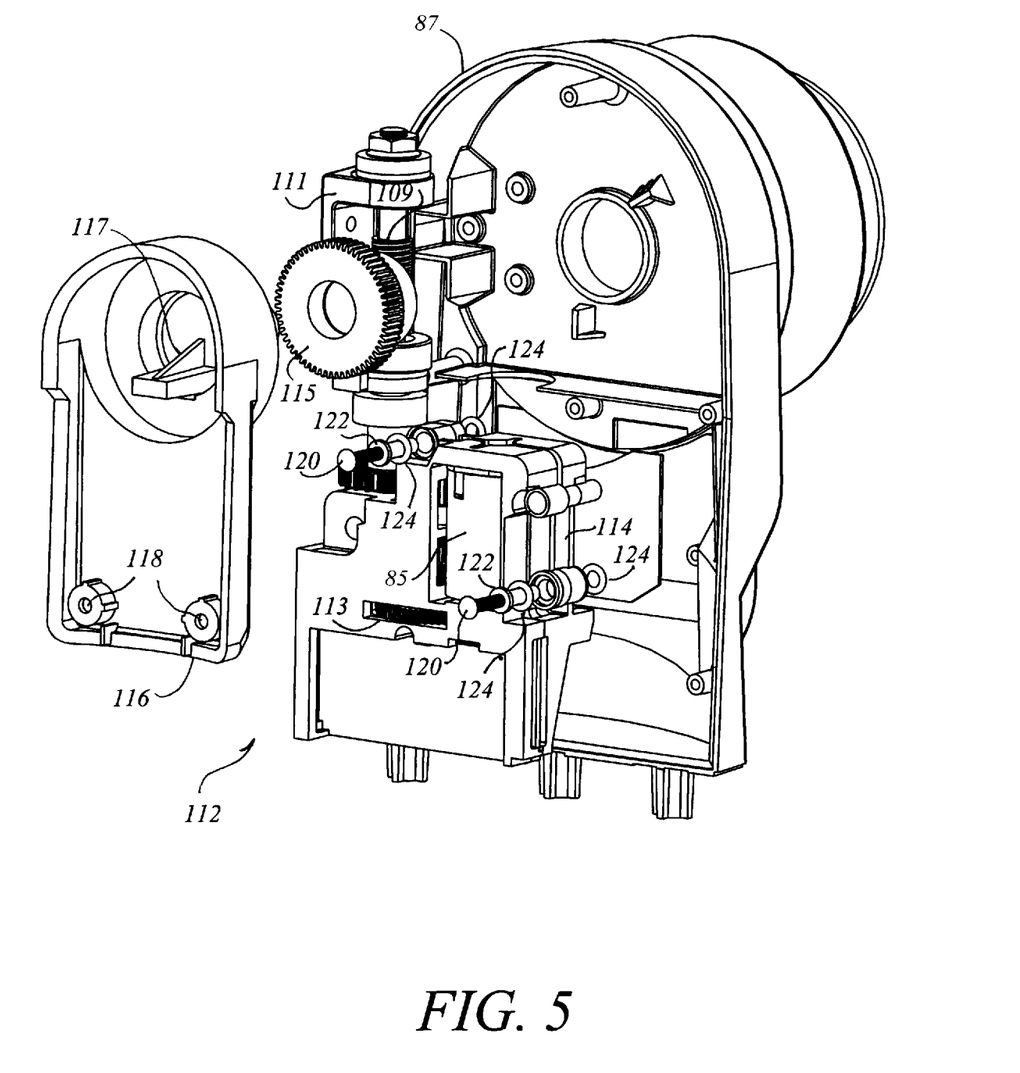
FIG. 5 is a perspective view of one arm of a fork assembly, showing the altitude motor/reduction gear/worm gear assembly thereof.

Referring now to FIG. 5, an arm 87 of a fork to which the telescope 12 is pivotally attached to facilitate altitude adjustment thereof is shown. An altitude motor/reduction gear/worm gear assembly 112, analogous to the azimuth motor/reduction gear/worm gear assembly 50 of FIGS. 2 and 3, is mounted within the arm 87. Shock/vibration mounting for the motor 85 and the platform 114 is similarly provided as discussed in detail below. Threaded fasteners 120 attach the platform 114 to the arm 87. Rubber o-rings 124 are located upon each threaded fastener 120 on either side of the platform 114, such that the platform 114 is sandwiched between the o-rings 124. Preferably, plastic bushings or sleeve washers 122 prevent excessive compression of the o-rings, by limiting the degree to which threaded fasteners 120 can be tightened.

Although the physical configuration or layout of the altitude motor/reduction gear/worm gear assembly 112 is somewhat different from that of the azimuth motor/reduction gear/worm gear assembly 50, this difference is merely to accommodate the packaging requirements of the arm 87, as opposed to those of the base 78. The components of the altitude motor/reduction gear/worm gear assembly 112 (particularly the motor 85, reduction gear assembly 113, and worm gear assembly 111 thereof) are otherwise similar in structure and function to those of the azimuth motor/reduction gear/worm gear assembly 50.

Worm gear 115 is driven by worm 109 and attaches via a clutch to altitude pivot shaft (not shown), which in turn rigidly attaches to telescope mount bracket 116, preferably via key 117 thereof. The telescope mount bracket 116 rigidly attaches to the telescope, preferably via threaded fasteners which are located within apertures 118, such that rotation of the worm gear 115 causes like rotation of the telescope 12.

Figure 6:
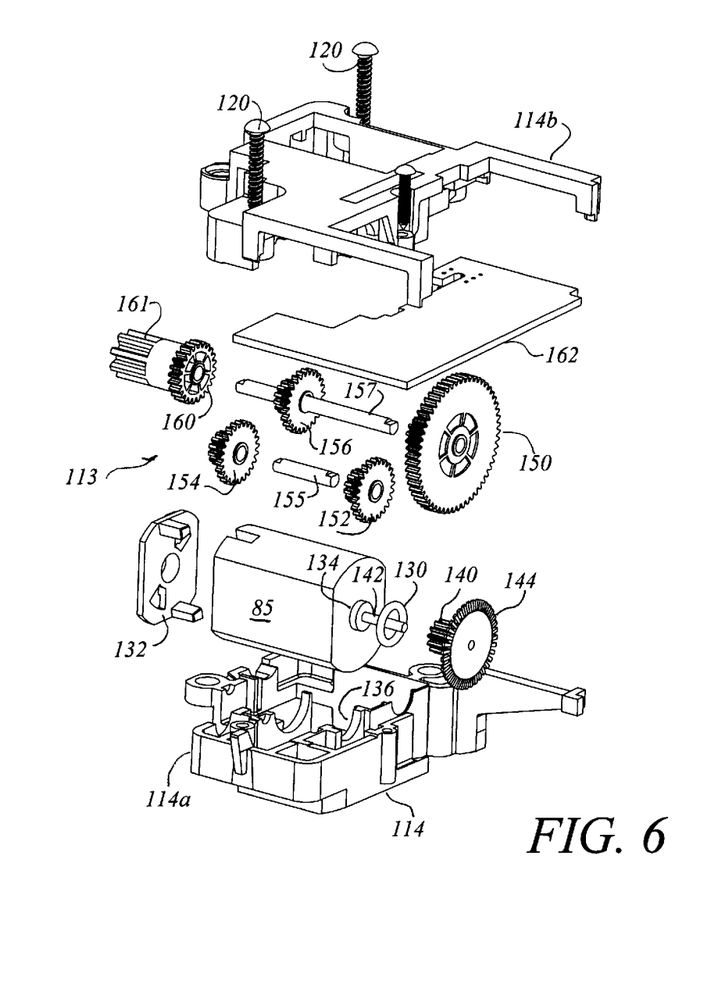
FIG. 6 is an exploded perspective view of the altitude motor/reduction gear assembly of FIG. 5.
Figure 7:
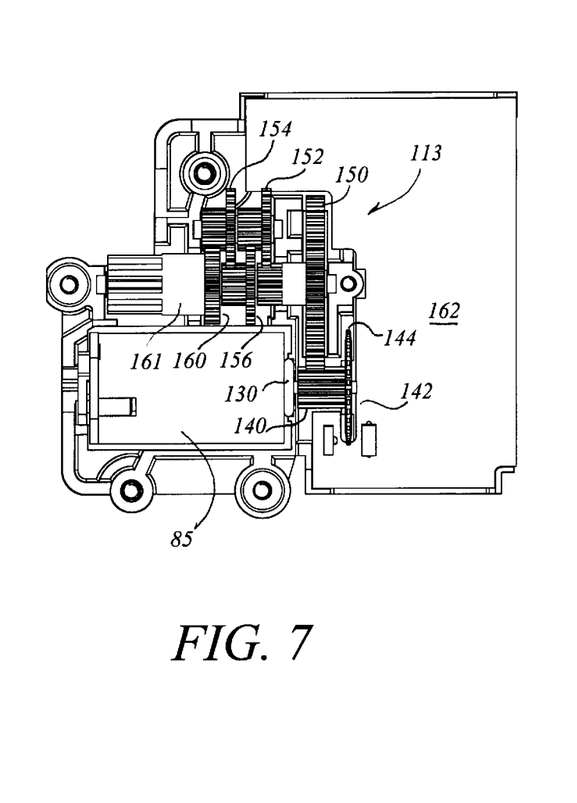
FIG. 7 is a plan view of the altitude motor/reduction gear assembly of FIG. 5.

Referring now to FIGS. 6 and 7, further details of the altitude motor 85 and the altitude reduction gear assembly 113 are shown. The motor 85 is mounted to the platform 114, defined by lower platform section 114a and upper platform section 114b, via shock/vibration isolators defined by rubber o-ring 130 and by resilient motor mount 132. O-ring 130 is located around boss 134 of motor 85 and is captured by cutouts 136 and 138, of the lower 114a and upper 114b platform sections, respectively. The resilient mount 132 attaches to the rear of motor 85 and mounts the rear of the motor 85 to the platform 114.

Motor drives, particularly in larger telescope systems, tend to generate a substantial amount of audible noise. Indeed, the amount of audible noise generated by larger telescopes systems can be annoying. The o-ring 130 and the resilient mount 132 substantially reduce the amount of audible noise produced.

Primary gear 140 is attached to shaft 142 of motor 85. Encoder wheel 144 is preferably formed as an integral unit with primary gear 140. Intermediate gears 150,152,154 and 156 are driven by primary gear 140 and are configured to provide the desired gear ratio. Output gear 160 facilitates attachment of the reduction gear assembly 113 to the worm gear assembly 111 (FIG. 5) via gear 161. Intermediate gears 152 and 154 are positioned upon shaft 155 and intermediate gears 150 and 156, as well as output gear 160, are positioned upon shaft 157.

A motor control circuit is formed upon printed circuit board 162 for providing precise control of the motor 85, as discussed in detail below.

Figure 8:
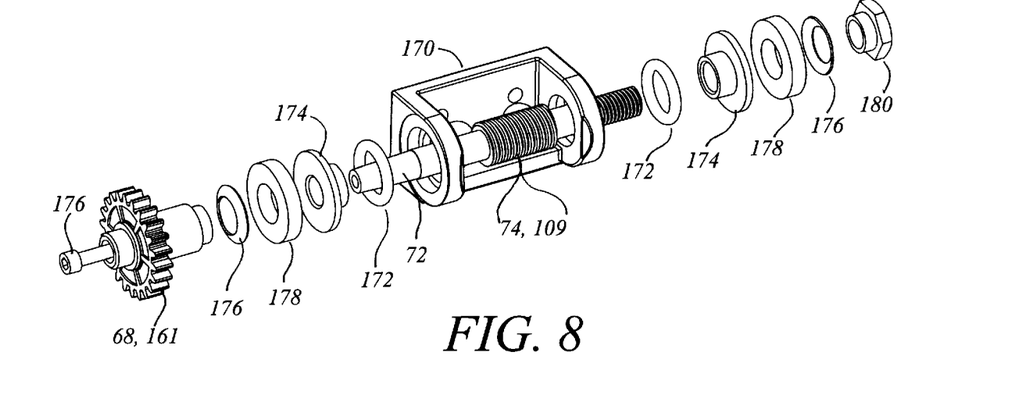
FIG. 8 is a perspective view of a vibration isolated worm assembly according to the present invention.
Figure 9:
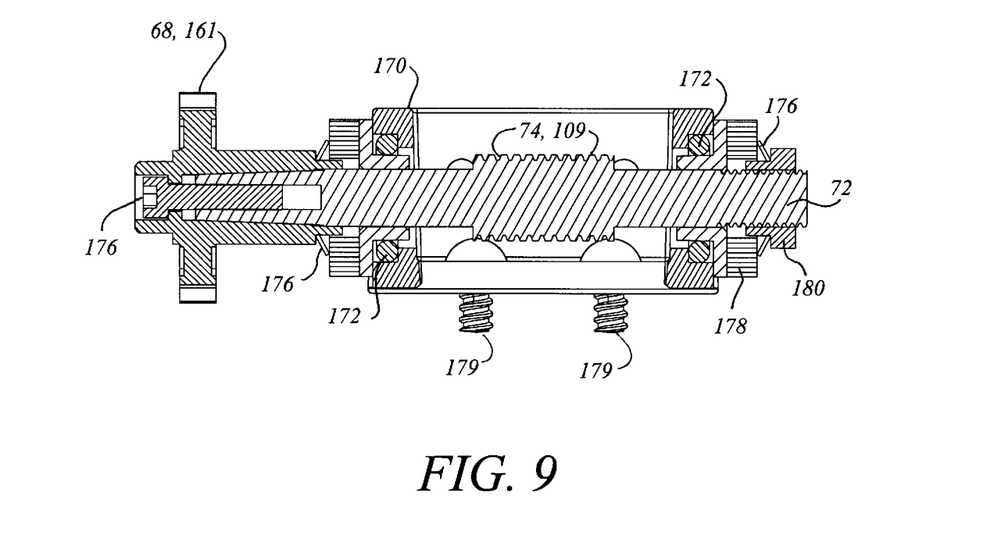
FIG. 9 is a cross-sectional view of the vibration isolated worm assembly of FIG. 8.

Referring now to FIGS. 8 and 9, worm 74, 109 is preferably shock/vibration isolated so as to mitigate the undesirable transmission of vibration from the motor to the telescope. The worm 74 of the azimuth motor/reduction gear/worm gear assembly 50 and the worm 109 of the altitude motor/reduction gear/worm gear assembly 113 are substantially identical and are discussed jointly below.

Shock/vibration isolation is provided by attaching the worm 74, 119 to the bracket 170 via a resilient material, such as that of two resilient o-rings 172. The resilient o-rings 172 are captured intermediate bracket 170 and bushings 174 (as best shown in FIG. 9) within which the shaft 72 of the worm rotates. Belville washers 176 are compressed against adjacent flat washers 178 by nut 180 on one end of the shaft 72 and by output gear 68, 161 which is attached to the opposite end of the shaft 72 via threaded fastener 176. Threaded fasteners 178 attach the worm bracket 170 to the base 78 and the arm 87.

The resilient o-rings provide a substantial amount of desirable vibration damping of the telescope. As those skilled in the art will appreciate, inadvertently tapping or bumping the telescope may result in the generation of vibrations or oscillations of the telescope which sometimes tend to last in excess of 30 seconds. Such oscillations or vibrations of the telescope are extremely undesirable in that they cause the field of view to move substantially and therefore inhibit viewing and/or photography. It has been found that the use of such resilient o-rings 172 to mount the worm 74 substantially reduces such undesirable oscillation or vibration of the telescope.

Figure 10:
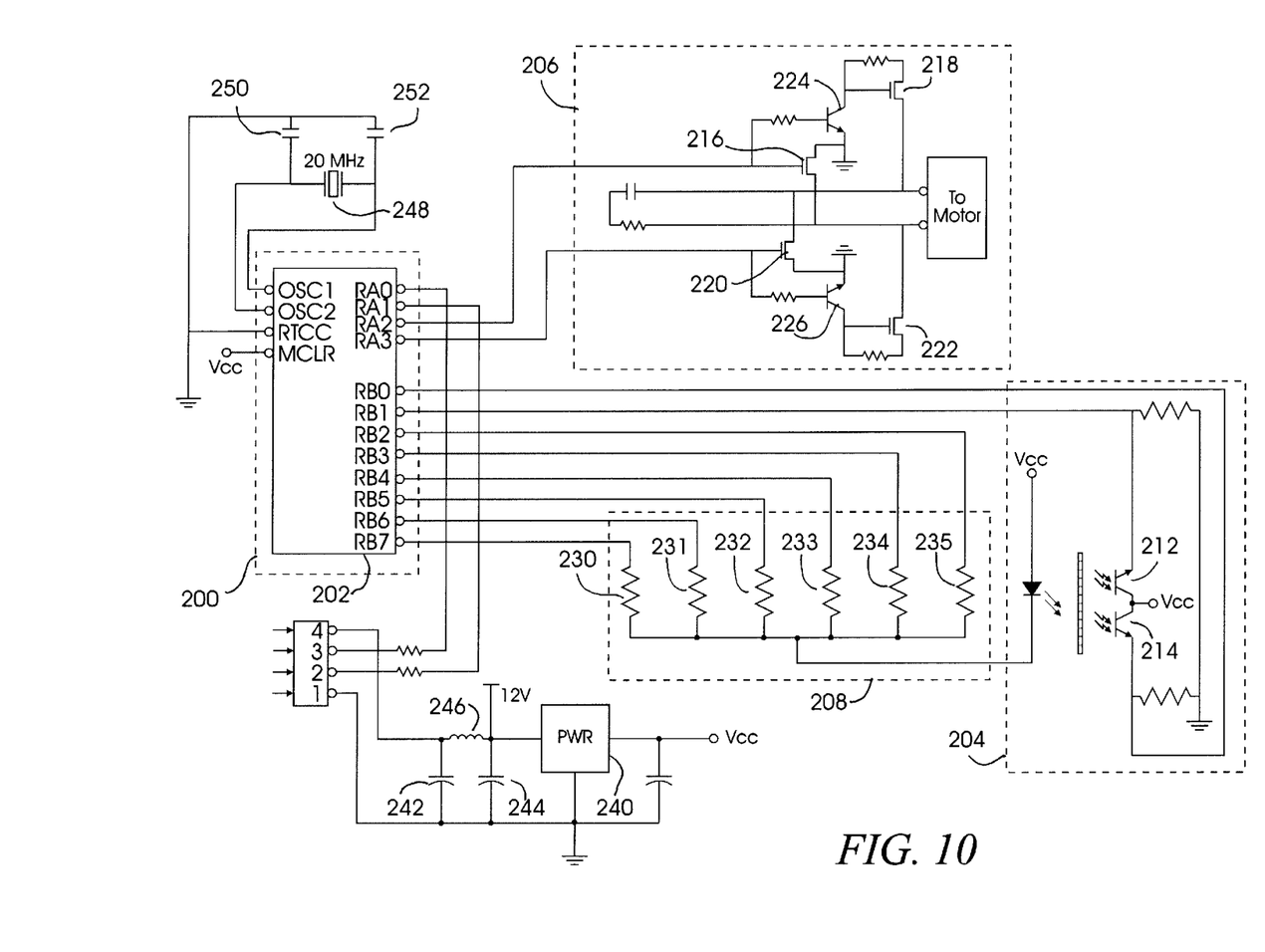
FIG. 10 is an electrical schematic of the motor controller of the present invention.

Referring now to FIG. 10, an electrical schematic of the circuitry for driving the motor 52, 85 is shown. Since the circuits for driving the azimuth 52 and altitude 85 motors are substantially identical, they will be describe jointly below.

A control circuit 200 receives a servo feedback signal from encoder circuit 204 and provides a motor drive signal, the amplitude and/or pulse width of which determines the speed of the motor 52, 85, to drive circuit 206 which provides the power necessary to drive the motor 52, 85. Calibration circuit 208 assures proper operation of the encoder, as discussed below.

The control circuit 200 preferably comprises a PTC16C54 microcontroller 202 couple to receive inputs RB0 and RB1 thereof signal from photodetector 212 and photodetector 214, respectively, of the encoder circuit 204, which are indicative of the speed and relative rotational position of the motor 52, 85. The encoder circuit comprises an LED 210 which emits light toward the encoder wheel 60, 144. Light which passes between the spokes or teeth of the encoder wheel 60, 144 is received by the two photodetectors 212 and 214, which operate in quadrature to provide enhanced resolution for servo feedback control, as discussed above.

The microcontroller 202 is coupled to transmit a motor drive control signal from outputs RA2 and RA3 thereof to the motor drive circuit 206. The DC motor may be driven in either direction, so as to position the telescope 12 as desired. Field effect transistors 216 and 218 cooperate to provide a drive signal of a first polarity to the motor 52, 85 to drive the motor 52, 85 in a first direction when a signal is provided on output RA2 of microcontroller 202 and field effect transistors 220 and 222 cooperated to provide a drive signal of a second polarity to motor 52, 85 to drive the motor 52, 85 in a second direction when a signal is provided on output RA3 of microcontroller 202. Bipolar transistors 224 and 226 cooperate with field effect transistors 218 and 222, respectively, to cause field effect transistors 218 and 222 to provide opposite polarity signals to the motor 52, 85 from those provided by field effect transistors 216 and 220, respectively. Thus, field effect transistors 216, 218, 220, and 222 cooperate to provide power to drive the motor 52, 85 at the desired speed and in the desired direction, as directed by microcontroller 202.

The speed of the drive motor 52, 58 is preferably controlled by pulse width modulation (PWM), wherein the speed of the motor is proportional to the width of each pulse in a series of pulses provided thereto, according to well known principles. Thus, when it is desired to move the telescope at a faster rate, then pulse width is increased and when it is desired to move the telescope at a slower rate, then pulse width is decreased. Optionally, the number of pulses and/or the voltage of the pulses can also be varied so as to provide desired control, according to well known principles.

The brightness of the LED 210 can be determined by the microcontroller 202 by determining the amplitude of the signals from the photodetectors on inputs RB0 and RB1 of the microcontroller 202. The microcontroller provides between one and six outputs to the calibration circuit 208 so as to cause the LED 210 to have a desired brightness. More particularly, outputs RB2 through RB7 selectively switch resistors 230 through 235 into series with LED 210 (and into parallel with one another), so as to vary the current through LED 210, and thus vary the brightness of LED 210. In this manner, the brightness of LED 210 is maintained within a desired range, as discussed above.

Voltage regulator 240, in cooperation with capacitors 242 and 244 and inductor 246 receives 12 VDC from connector JP2 and provides regulated VCC. Crystal oscillator 248, in cooperation with capacitors 250 and 252, facilitates the generation of a clock signal for microcontroller 202. Alternatively, a ceramic resonator may be wed in place of crystal oscillator 248.

Figure 11:
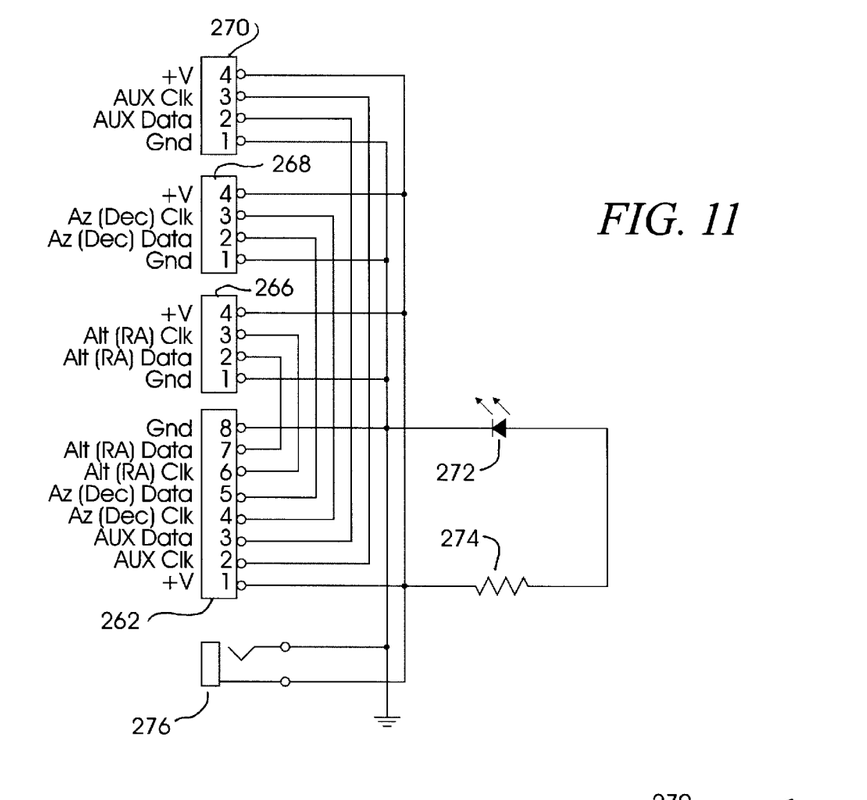
FIG. 11 is an electrical schematic of a controller/motor interface of the present invention.
Figure 12:
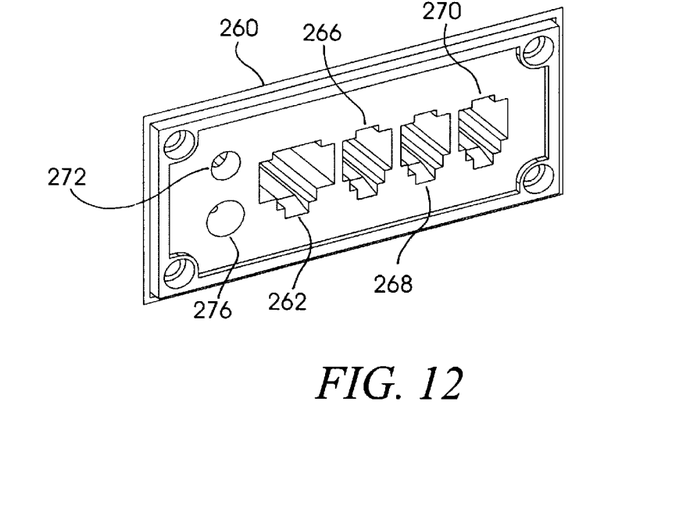
FIG. 12 is a perspective view of the connector of the controller/motor interface of FIG. 11.

Referring now to FIGS. 11 and 12, electrical junction 260 facilitates the connection of a hand held controller, e.g., hand box, to the motors of a motorized telescope mount. Junction 260 is an alternative to interface 100, although both may be utilized if desired. The junction 260 accommodates either the motors of an altitude azimuth telescope mount or the motors of an equatorial mount. 4-pin RJ-11 I/O port 270 facilitates the connection of auxiliary data and auxiliary clock signals from a hand held controller connected to 8-pin RJ-11 I/O port 262 to the desired auxiliary devices. 4-pin RJ-11 I/O port 268 facilitates the connection of either the declination motor (equatorial mount) or the altitude motor (altitude azimuth mount) to the hand held controller via 8-pin RJ-11 I/O port 262. Similarly, 4-pin RJ-11 I/O port 266 facilitates the connection of either the right ascension motor (equatorial mount) or the azimuth motor (altitude azimuth mount) to the hand held controller via 8-pin RJ-11 I/O port 262. LED 272 illuminates when 12 VDC is provided at connector 276. Resistor 274 limits current through LED 272. 12 VDC is provided to each of the 4-pin RJ-11 I/O ports 266, 268 and 270 and to the 8-pin RJ-11 I/O port 262 from power connector 276.

More particularly, auxiliary data and auxiliary clock signals are provided on two separate conductors to 4-pin RJ-11 I/O port 270 by 8-pin RJ-11 I/O port 262. Declination/altitude clock and declination/altitude data signals are provided on two separate conductors to 4-pin I/O port 268 by 8-pin RJ-11 I/O port 262. Similarly, right ascension/azimuth clock and right ascension/azimuth data signals are provided on two separate conductors to 4-pin RJ-11 I/O port 266 by 8-pin RJ-11 I/O port 262. Thus, a 2-wire interface (clock and data) is provided for facilitating control of the telescope drive motors by the hand held controller.

It is understood that the exemplary telescope system described herein and shown in the drawings represents only a presently preferred embodiment of the invention. Indeed, various modifications and additions may be made to such embodiment without departing from the spirit and scope of the invention. For example, description of the invention as being applicable to altitude and azimuth mounting and motor control is by way of example only, and not by way of limitation. Thus, those skilled in the art will appreciate that the present invention is likewise applicable to equatorial and/or any other desired type of telescope mount. Thus, these and other modifications and additions may be obvious to those skilled in the art and may be implemented to adapt the present invention for use in a variety of different applications.

What is claimed is:

1. An automated telescope system of the type including a telescope mounted for rotation about an altitude and an azimuth axis, the automated telescope system comprising:

a command processor, the command processor receiving an input representing a position of a desired viewing object, the position characterized in terms of a celestial coordinate system, the command processor translating the input into a position characterized in terms of an altitude/azimuth coordinate system, the command processor calculating an amount of movement about each axis, to move the telescope from a present position to a desired position which points the telescope at the desired viewing object, the command processor outputting motor movement commands for each respective axis; and two intelligent motor portions, each coupled to rotate the telescope about a respective one of the axes, each motor portion including:
  a motor having a rotatable shaft;
  a motion indicator coupled to the motor, the motion indicator developing motion indication signals corresponding to actual motor movement; and
  an intelligent motor control processor, coupled to the motor and the motion indicator, the motor control processor further coupled to receive motor movement commands from the command processor, the motor control processor processing each respective motor movement command into motor control commands defining operational movement of the motor, the motor control processor further receiving motion indication signals and comparing actual operational movement of its respective motor to commanded operational movement, the motor control processor modifying motor control commands in response to differences therebetween.

2. The telescope system according to claim 1, the motor control processor including a position register, the register storing a calculated actual extent of motor movement wherein the motor control processor provides the register contents to the command processor, the command processor translating the register contents into telescope angular displacement about the corresponding axis and thereby into a present telescope position.

3. The telescope system according to claim 2 wherein the motion indicator comprises an incremental encoder, the motion indication signals corresponding to increments of the encoder, a timing between increments corresponding to a speed of movement and an amount of increments corresponding an actual extent of movement.

4. The telescope system according to claim 3 wherein the incremental encoder comprises an optical encoder operating in quadrature, the motor control processor processing the quadrature signal to determine motor speed and motor rotation direction.

5. The telescope system according to claim 4 wherein the motor control processor increments the position register with an actual extent of movement when the motor rotates in a first direction and wherein the motor control processor decrements the position register with an actual extent of movement when the motor rotates in a second direction.

6. The telescope system according to claim 1, further comprising:
  a geographic location database coupled to the command processor, the database containing entries each associating a geographic place name with a corresponding set of earth-based coordinates; and
  wherein the command processor receives a place name input corresponding to a geographic location proximate to a user, the command processor processing the corresponding set of earth-based coordinates and the contents of both motor controller's position registers so as to determine the present position of the telescope system with respect to the celestial coordinate system.

7. The telescope system according to claim 1 further comprising:
  a celestial object database coupled to the command processor, the database containing entries each associating a celestial object with a corresponding set of celestial coordinates; and
  wherein the command processor receives an input corresponding to a desired celestial object to view, the command processor processing the corresponding set of celestial coordinates and the present position of the telescope system so as to calculate an amount of altitude and azimuth axis movement sufficient to point the telescope to the desired celestial object, the command processor further calculating a dynamic movement profile for each axis so as to track the desired celestial object's motion.

8. The telescope system according to claim 7 wherein the command processor translates each axis' dynamic movement profile into motor speed and direction commands and outputs said motor commands to the corresponding motor control processor, the motor control processor controlling motor movement in response thereto, thereby freeing the command processor to perform further processing and calculation tasks during telescope movement.

9. In an automated telescope system of the type including a telescope mounted for rotation about two substantially orthogonal axes, a method for operating the system comprising:
  retrieving an input representing a position of a desired viewing object, the position characterized in terms of a celestial coordinate system;
  processing the input in a command processor into a position characterized in terms of a rectangular coordinate system, the command processor determining a present position about each axis, and calculating a displacement in the rectangular coordinate system for each axis to point the telescope at the desired viewing object;
  processing each axial displacement into motor movement commands for that axis;
  outputting each motor movement command to a corresponding motor control processor coupled to that axis;
  processing each respective motor movement command, in each said respective motor control processor, into motor control commands defining operational movement of a motor coupled to each respective axis;
  operating each motor in accordance with its motor control commands;
  evaluating actual operational movement of each motor by a motion sensor, the sensor developing motion indication signals corresponding to an amount of motor rotational movement, the evaluating step including:
  reading an amount of motor rotational movement;
  calculating a total amount of motor movement;
  recording the total amount as a content of a position register; and
  providing the register contents to the command processor, wherein the command processor translates the register contents into telescope angular displacement about the corresponding axis and thereby a present telescope position.

10. The method according to claim 9, wherein each respective motor control processor compares actual operational movement of its respective motor to commanded operational movement and modifies motor control commands in response to differences therebetween.

11. The method according to claim 9, wherein the motion sensor comprises an incremental encoder, the motion indication signals corresponding to increments of the encoder, a timing between increments corresponding to a speed of movement and an amount of increments corresponding an extent of movement.

12. The method according to claim 11, wherein the incremental encoder comprises an optical encoder operating in quadrature, the motor control processor processing the quadrature signal to determine motor speed and motor rotation direction.

13. The method according to claim 12, further comprising:

incrementing the contents of the position register with an extent of movement when the motor rotates in a first direction; and decrementing the contents of the position register with an extent of movement when the motor rotates in a second direction.

14. The method according to claim 9, further comprising:

accessing a celestial object database coupled to the command processor, the database containing entries each associating a celestial object with a corresponding set of celestial coordinates; and providing an input corresponding to a desired celestial object to view;

providing the corresponding set of celestial coordinates from the database;

retrieving the corresponding set of celestial coordinates and the present position of the telescope system so as to calculate an amount of altitude and azimuth axis movement sufficient to point the telescope to the desired celestial object;

calculating a dynamic movement profile for each axis so as to track the desired celestial object's motion;

translating each axis' dynamic movement profile into motor speed and direction commands; and outputting said motor commands to the corresponding motor control processor, wherein the motor control processor controls motor movement in response thereto, thereby freeing the command processor to perform further processing and calculation tasks during telescope movement.

15. An automated telescope system of the type including a telescope mounted for rotation about two substantially orthogonal axes, the automated telescope system comprising:

first and second motor portions, each coupled to rotate the telescope about a respective one of the axes, each motor portion including:

a motor having a rotatable shaft;

an encoder coupled to the motor shaft, the encoder outputting signals corresponding to an amount of movement of its respective motor; and a motor control processor, configured to receive encoder signals from a respective encoder, the motor control processor calculating and outputting motor control commands in operative response thereto, the motor control processor including a position register, the register storing a calculated actual extent of motor movement; and a command processor operatively connected to the motor portions, the command processor receiving an input corresponding to a position of a desired viewing object, the command processor further receiving an input corresponding to present position of the telescope, the command processor calculating a rotational movement about each of the respective axes to move the telescope from its present position to the position of the desired viewing object and outputting a corresponding motor movement command to each respective motor control processor.

16. The telescope system according to claim 15 wherein each motor control processor translates received motor movement commands into motor control commands, each motor control processor commanding motor movement and receiving encoder signals corresponding to actual motor movement, each motor control processor providing its register contents to the command processor, the command processor translating the register contents into telescope angular displacement about the corresponding axis to calculate thereby a present telescope position, the motor control processor processing received encoder signals to calculate an actual extent of motor movement.

17. The telescope system according to claim 16, wherein the input corresponding to a position of a desired viewing object is characterized in terms of a celestial coordinate system.

18. The telescope system according to claim 17, wherein the input corresponding to a present position of the telescope is characterized in terms of a rectangular coordinate system.

19. The telescope system according to claim 15 wherein the signals output by the encoder correspond to increments of the encoder, a timing between increments corresponding to a speed of movement and an amount of increments corresponding to an extent of movement.

20. The telescope system according to claim 19, wherein the incremental encoder comprises an optical encoder operating in quadrature, the motor control processor processing the quadrature signal to determine motor speed and motor rotation direction.

21. The telescope system according to claim 20, wherein the motor control processor increments the position register with a received extent of movement when the motor rotates in a first direction and wherein the motor control processor decrements the position register with a received extent of movement when the motor rotates in a second direction.

22. The telescope system according to claim 21, wherein the automated telescope system is of the type including a telescope mounted for rotation about an altitude and an azimuth axis.

23. The telescope system according to claim 15, further comprising:

a celestial object database coupled to the command processor, the database containing entries each associating a celestial object with a corresponding set of celestial coordinates; and wherein the command processor receives an input corresponding to a desired celestial object to view, the command processor processing the corresponding set of celestial coordinates and the present position of the telescope system so as to calculate an amount of altitude and azimuth axis movement sufficient to point the telescope to the desired celestial object.

24. The telescope system according to claim 23, wherein the command processor further calculates a dynamic movement profile for each axis so as to track the desired celestial object's motion.

25. The telescope system according to claim 24, wherein the command processor translates each axis' dynamic movement profile into motor speed and direction commands and outputs said motor commands to the corresponding motor control processor, the motor control processor controlling motor movement in response thereto, thereby freeing the command processor to perform further processing and calculation tasks during telescope movement.

26. The telescope system according to claim 25, further comprising:

a geographic location database accessible to the command processor, the database containing entries each associating a geographic place name with a corresponding set of earth-based coordinates; and wherein the command processor receives a place name input corresponding to a geographic location proximate to a user, the command processor processing the corresponding set of earth-based coordinates and the contents of both motor controllers' position registers so as to determine the present position of the telescope system with respect to the spherical coordinate system.

* * * * *

UNITED STATES PATENT AND TRADEMARK OFFICE
CERTIFICATE OF CORRECTION

PATENT NO. : 6,563,636 B1
DATED : May 13, 2003
INVENTOR(S) : Baun et al.

It is certified that error appears in the above-identified patent and that said Letters Patent is hereby corrected as shown below:

Title page,
Item [75], Inventor, after "Kenneth W. Baun, Trabuco Canyon, CA (US)", add
-- John E. Hoot, San Clemente, CA (US) --, and delete "Stanley H. Dewan, Rancho Santa Margarita, CA (US)"

Signed and Sealed this

Twelfth Day of July, 2005

JON W. DUDAS
*Director of the United States Patent and Trademark Office*